United States Patent
Bae et al.

(10) Patent No.: US 6,848,112 B2
(45) Date of Patent: Jan. 25, 2005

(54) TRAY LOCKING APPARATUS USED WITH A DISC DRIVE

(75) Inventors: Byoung-young Bae, Pyeonqtaek-si (KR); Un-jin Choi, Seoul (KR); Soon-kyo Hong, Seoul (KR); Young-woo Huh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 10/307,502

(22) Filed: Dec. 2, 2002

(65) Prior Publication Data

US 2003/0117929 A1 Jun. 26, 2003

(30) Foreign Application Priority Data

Dec. 1, 2001 (KR) ........................................ 2001-75673

(51) Int. Cl.[7] .............................................. G11B 33/02
(52) U.S. Cl. .................................... 720/600; 369/75.21
(58) Field of Search ..................... 720/600; 360/99.02, 360/99.06; 369/75.11, 75.21, 77.11, 77.21, 291.1, 75.1, 75.2, 77.1, 77.2

(56) References Cited

U.S. PATENT DOCUMENTS 5,864,529 A * 1/1999 Liao et al. ................. 369/75.1
6,603,723 B2 * 8/2003 Minase ....................... 369/75.2
2002/0163871 A1 * 11/2002 Yoshida ...................... 369/77.2

OTHER PUBLICATIONS

Japanese abstract, Locking Mechanism For Tray in Information Recording and Reproducing Device, Japanese Patent Publication No. 2000–11513, Jan. 14, 2000.

* cited by examiner

Primary Examiner—Allen Cao
(74) Attorney, Agent, or Firm—Staas & Halsey LLP

(57) ABSTRACT

A tray locking apparatus of a disc drive to lock a tray on which a disc is accommodated and which is inserted into a main body of the disc drive. The tray locking apparatus includes a locking pin provided at the main body, a locking lever rotatably installed at the tray and having a hook portion at one end thereof which is caught by the locking pin as the tray is inserted into the main body, an elastic member to elastically bias the locking lever in the direction in which the hook portion is caught by the locking pin, a driving mechanism to rotate the locking lever to escape from a position where the hook portion is caught by the locking pin when the tray is drawn, and a counter impact unit installed adjacent to the locking lever and having a moment to rotate in a direction opposite to that of the locking lever, so that when the locking lever is rotated by an impact in a direction to be unlocked, the counter impact unit rotates in the opposite direction and bumps against the locking lever. Thus, when an external impact is applied, the locking state of the tray can be firmly maintained.

11 Claims, 11 Drawing Sheets

TRAY LOCKING APPARATUS USED WITH A DISC DRIVE

CROSS-REFERENCE TO RELATED APPLICATIONS

This application claims the benefit of Korean Application No. 2001-75673, filed Dec. 1, 2001, in the Korean Intellectual Property Office, the disclosure of which is incorporated herein by reference.

BACKGROUND OF THE INVENTION

1. Field of the Invention

The present invention relates to a tray locking apparatus which firmly locks a tray inserted in a disc drive and unlocks the tray when it is unloaded from the disc drive.

2. Description of the Related Art

In a typical disc drive which uses a disc as a recording medium, a tray loading the disc and carrying it into the drive is provided. That is, when a disc that is loaded on a tray is inserted into the drive, the disc is loaded at a loading position in the drive and a recording or reproducing operation is performed with respect to the disc in the drive. The tray must not be ejected from the drive due to an external impact during recording or reproduction. Thus, to prevent the above accident, a locking apparatus to lock the tray that is inserted in the drive is provided.

Figure 1:
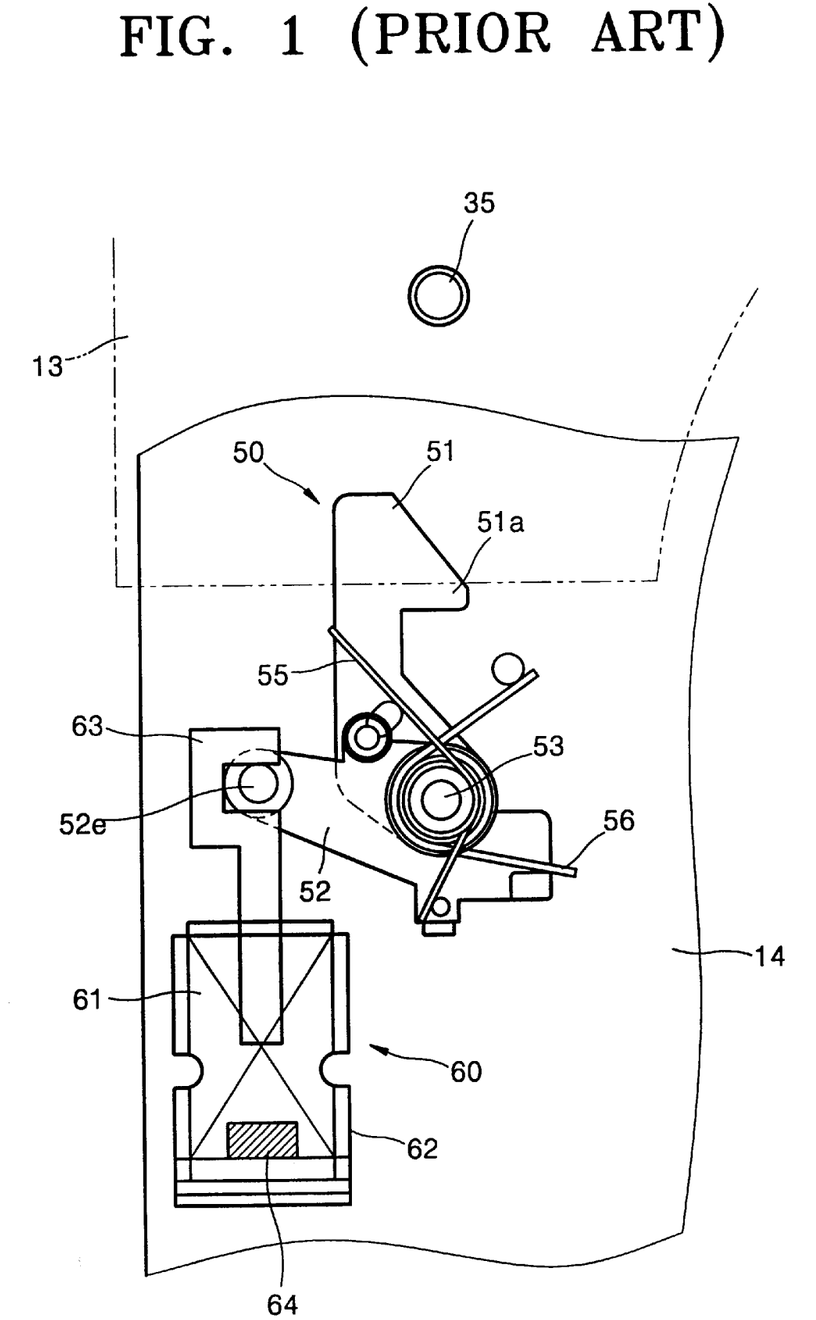
FIG. 1 is a view showing a conventional tray locking apparatus.

FIG. 1 shows the structure of a conventional tray locking apparatus which is disclosed in Japanese Patent Publication No. 2000-11513. As shown in the drawing, the conventional tray locking apparatus includes a locking pin 35 provided in a drive main body 13, a locking lever 50 installed at the lower surface of a tray 14 which is selectively locked by the locking pin 35, and a driving mechanism 60 to drive the locking lever 50.

The locking lever 50 includes an arm 51 having a hook portion 51a coupled to the locking pin 35 and rotatably installed at a rotation shaft 53 provided at the lower surface of the tray 14, and a lever 52 rotatably installed on the rotation shaft 53 to be coaxial with the arm 51. The arm 51 is elastically biased by a first spring 55 clockwise with respect to the lever 52. The lever 52 is elastically biased by a second spring 56 clockwise with respect to the tray 14. Thus, the locking lever 50 receives an elastic force to make the hook portion 51a coupled to the locking pin 35.

The driving mechanism 60 includes a plunger 63 supported by a yoke 62 such that one end of the plunger 63 is coupled to a coupling pin 52e of the lever 52, a permanent magnet 64 applying an attraction force to the other end of the plunger 63, and a coil 61 wound around the yoke 62 and applying an electromagnetic force to the plunger 63.

Figure 2A:
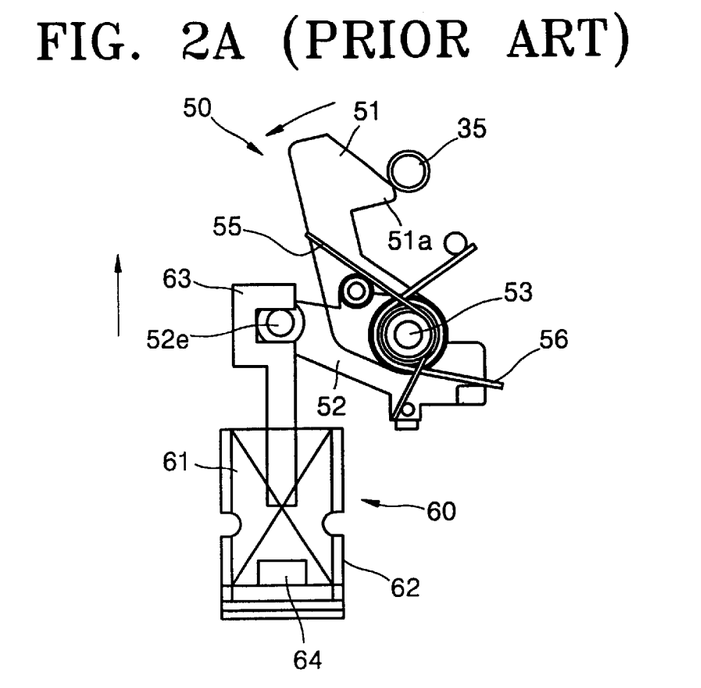
FIGS. 2A through 2D are views sequentially showing locking and unlocking processes performed by the tray locking apparatus of FIG. 1.
Figure 2B:
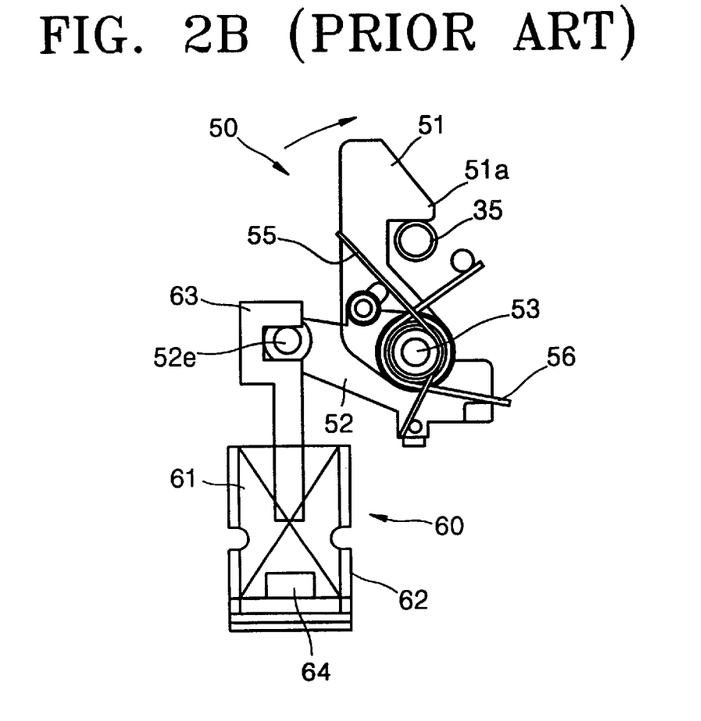

When the tray 14 having the above locking apparatus is inserted into the drive main body 13, the hook portion 51a of the arm 51 is pushed by the locking pin 35 and rotated counterclockwise, as shown in FIG. 2A. Then, the tray 14 continues to enter the drive main body 13 and is completely loaded at an installation position in the drive main body 13, as shown in FIG. 2B, the arm 51 is returned to the original position by the elastic force of the first spring 55 and the hook portion 51a is caught by the locking pin 35. Thus, since the hooking portion 51a is caught by the locking pin 35, the hooking portion 51a is prevented from being removed from the main body 13. Here, since current flows in the coil 61 so that an electromagnetic force is applied to the plunger 63 in the opposite direction to the attraction force of the permanent magnet 64, a state in which the two forces are offset is maintained.

Figure 2C:
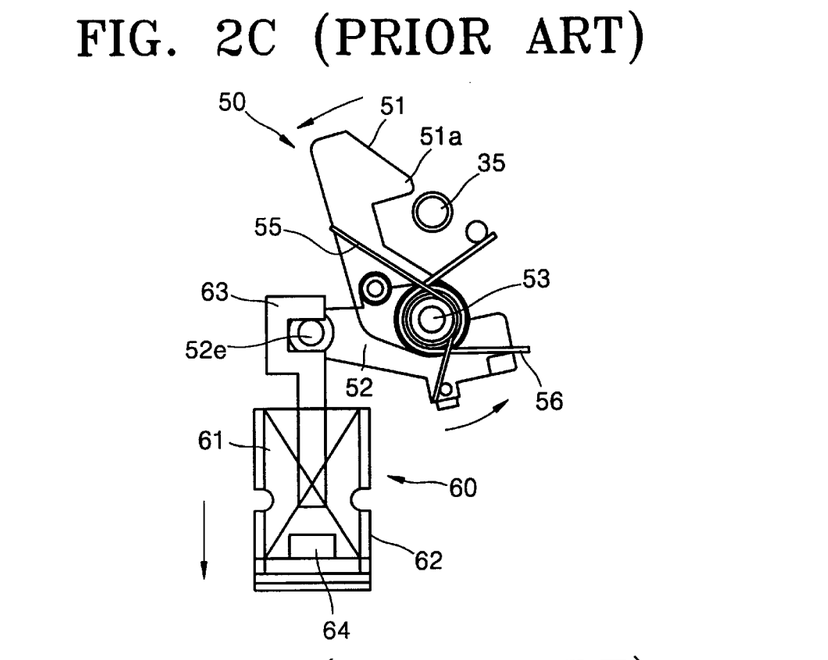

When the tray 14 is drawn from the drive main body 13, the direction of the current flowing in the coil 61 is controlled such that the electromagnetic force is applied to the plunger 63 in the same direction as the attraction force by the permanent magnet 14. Then, the plunger 63, receiving the attraction force of the permanent magnet 64 and the electromagnet force formed by the current flowing in the coil 61, is moved toward the permanent magnet 64, as shown in FIG. 2C. Here, the plunger 63 pulls the coupling pin 52e and the locking lever 50 is rotated counterclockwise. Accordingly, the hook portion 51a is separated from the locking pin 35 and the tray 14 is smoothly drawn from the drive main body 13.

Figure 2D:
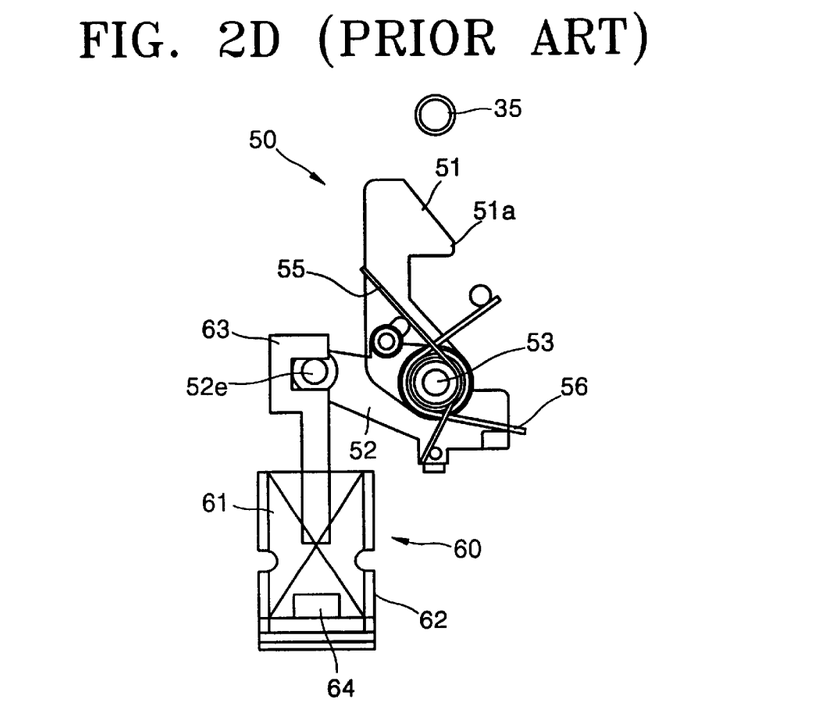

A push unit (not shown) to apply an elastic force to the tray 14 in a direction outside the drive main body 14 is typically installed in the drive main body 13. Thus, during unlocking, the push unit slightly pushes the tray 14 outside the drive main body 13. Then, a user can manually pull the tray 14 from the drive main body 13. When the tray 14 is drawn during unlocking, current is applied to the coil 61 of the driving mechanism 60 so that an electromagnetic force in the opposite direction to the attraction force of the permanent magnet 64 is applied to the plunger 63. Then, the two forces are offset and the plunger 63 is in a free state. Here, the locking lever 50 is returned to the original position by the elastic force of the first and second springs 55 and 56, as shown in FIG. 2D.

However, in the tray locking apparatus having the above structure, when a strong impact is applied to the disc drive from the outside, the hook portion 51a of the locking lever 50 is unlocked as the hook portion 51a, caught by the locking pin 35, is slightly moved counterclockwise. If the impact acts in a direction in which the tray 14 is pushed out of the drive main body 13 during unlocking, the tray 14 can be ejected from the drive main body 13 so that a stable recording and reproduction operation is not possible.

Also, to maintain a locking state in which the hook portion 51a of the locking lever 50 is coupled to the locking pin 35 in the above locking apparatus, since current is continuously applied to the coil 61 to generate the electromagnetic force to offset the attraction force by the permanent magnet 64, power consumption increases.

SUMMARY OF THE INVENTION

Accordingly, it is an object of the present invention to provide an improved tray locking apparatus of a disc drive which can stably maintain a locking state of a tray against an outside impact.

Additional objects and advantages of the invention will be set forth in part in the description which follows and, in part, will be obvious from the description, or may be learned by practice of the invention.

The foregoing and other objects of the present invention are achieved by providing a tray locking apparatus of a disc drive to lock a tray on which a disc is accommodated and which is inserted into a main body of the disc drive, the tray locking apparatus comprising: a locking pin provided at the main body; a locking lever rotatably installed at the tray and having a hook portion at one end thereof which is caught by the locking pin as the tray is inserted into the main body; an elastic member to elastically bias the locking lever in the direction in which the hook portion is caught by the locking pin, a driving mechanism to rotate the locking lever to escape from a position where the hook portion is caught by the locking pin when the tray is drawn; and a counter impact unit installed adjacent to the locking lever and having a moment to rotate in a direction opposite to that of the locking lever so that when the locking lever is rotated by an impact in a direction to be unlocked, the counter impact unit rotates in the opposite direction and bumps against the locking lever.

in an aspect of the present invention, the counter impact unit comprises: a counter impact lever rotatably installed at a position facing the locking pin with respect to the locking lever disposed therebetween; and a stopper provided at a position facing the locking lever with respect to the counter impact lever disposed therebetween to prevent rotation of the counter impact lever in one direction.

In another aspect of the present invention, the driving mechanism comprises: a bobbin having a cavity; a plunger having one end inserted into the cavity of the bobbin to be capable of sliding and the other end coupled to the locking lever; a coil wound around the bobbin; a magnet installed at one side of the plunger where the plunger is coupled to the locking lever; and a magnetic body installed at the bobbin to generate attraction with the magnet.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
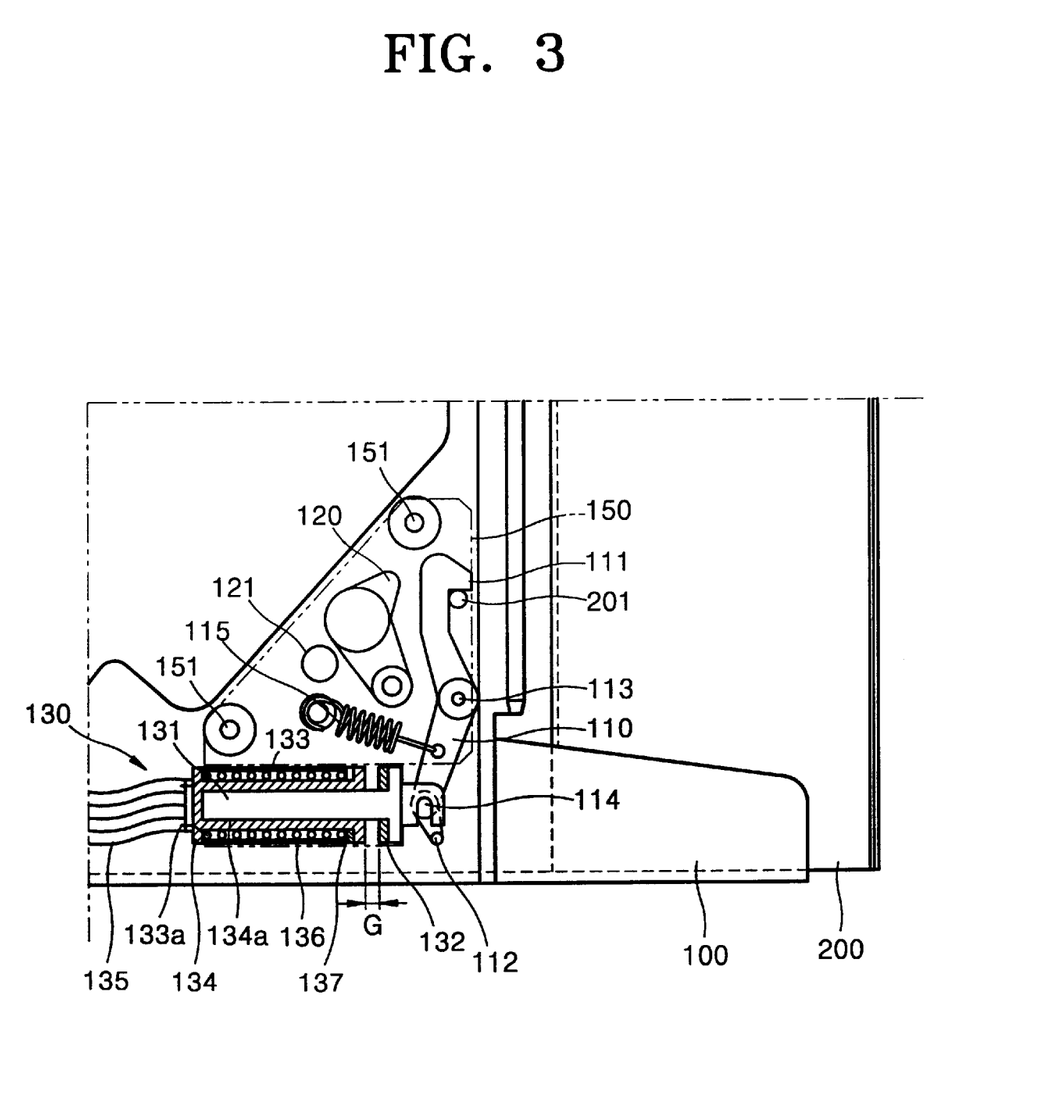
FIGS. 3 through 7 are views sequentially showing locking and unlocking processes performed by a tray locking apparatus according to an embodiment of the present invention.

FIGS. 3 through 8 show one side of a lower surface of a tray where a locking apparatus according to an embodiment of the present invention is installed. Referring to FIG. 3, a locking pin 201 to lock a tray 100 is provided in a disc drive main body 200. A bracket 150 is fixedly installed by a coupling member 151 at a lower surface of the tray 100. A locking lever 110, caught by the locking pin 201 when the tray 100 enters the main body 200, is installed on the bracket 150 to be capable of rotating with respect to a rotation shaft 113. A hook portion 111, caught by the locking pin 201, is provided at one side of the locking lever 110. A coupling pin 114 coupled to a plunger 131, which will be explained later, and a manual push portion 112, extended such that a user can manually rotate the locking lever 110, are provided at the other side of the locking lever 110. The locking lever 110 is elastically biased clockwise by a spring 115, that is, biased in a direction in which the hook portion 111 is caught by the locking pin 201.

Also, a driving mechanism 130 to rotate the locking lever 110 in a direction opposite to the elastic force of the spring 115 is provided. The driving mechanism 130, which is operated during an unlocking operation, that is, when the hook portion 111 is unlocked from the locking pin 201, includes a bobbin 134 having a cavity 134a, a plunger 131 installed in the cavity 134a to be capable of sliding, a coil 133 wound around the bobbin 134, on which current flows, a magnetic body 137 installed at an exit side of the bobbin 134, and a permanent magnet 132 attached to the plunger 131. Here, one end portion of the plunger 131 is inserted into the cavity 134a to be capable of sliding. The other end portion of the plunger 131 is coupled to the coupling pin 114 of the locking lever 110. Thus, as the plunger 131 slides in the cavity 134a, the locking lever 110 is rotated around the rotation shaft 113.

Figure 9:
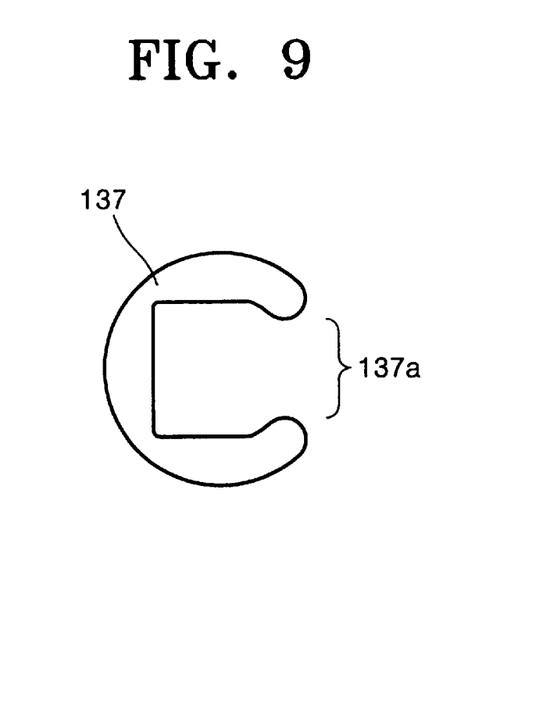
FIG. 9 is a view showing a magnetic body of the tray locking apparatus of FIG. 3.
Figure 10:
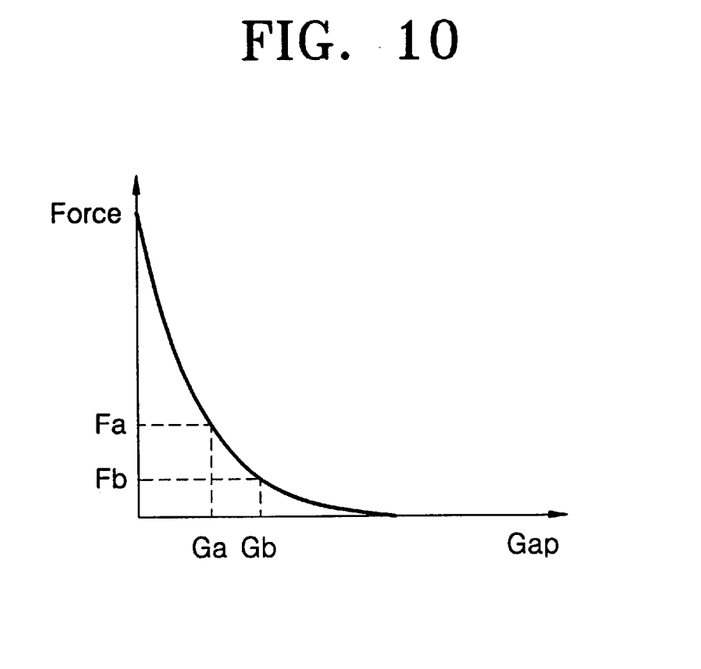
FIG. 10 is a graph showing the relationship between a magnetic force and a distance between two objects to which the magnetic force is applied.

The permanent magnet 132 tends to move toward the magnetic body 137 due to the magnetic force thereof. Thus, since the permanent magnet 132 moves the plunger 131 to rotate in a direction in which the locking lever 110 is locked by the locking pin 201, the permanent magnet 123, as well as the spring 115, maintains a locking state of the locking lever 110. The coil 133, wound around the bobbin 134, pushes the coupling pin 114 due to repulsion generated when current is applied to one end portion of the bobbin 134 to form a polarity opposite to the permanent magnet 132, if necessary, so that the locking lever 110 is rotated in an unlocking direction. Meanwhile, a slight gap G is provided between the permanent magnet 132 and the end portion of the bobbin 134. Because a magnetic force between two objects decreases as the gap therebetween increases, as shown in FIG. 10, when there is no gap, the magnetic force is considerably strong. Thus, when the permanent magnet 132 and the end portion of the bobbin 134 closely contact each other, moving the plunger 131 to rotate the locking lever 110 in the unlocking direction is difficult. Accordingly, it is preferable to have a gap Ga-Gb within an appropriate range so that the magnetic force is not too strong and not too weak. As shown in FIG. 9, the magnetic body can be formed of a ring member 137 having a "C" shape which can be inserted around the outer circumferential surface of the bobbin 134 through an open portion 137a. As shown in FIG. 10, the magnetic body can be formed of a member 137' having a "T" shape which can be inserted into a coupling groove 134b at the end portion of the bobbin 134. Reference numeral 135 denotes an FPC (flexible printed circuit) connected to a terminal portion 133a of the coil 133. Reference numeral 136 denotes an insulation tape.

Next, a counter impact lever 120, whose rotation range is limited by a predetermined stopper 121, is rotatably installed close to the locking lever 110. Since the center of gravity of the counter impact lever 120 is disposed toward the counterclockwise direction, that is, toward the stopper 121, when an impact is applied, the counter impact lever 120 is rotated in a direction of bumping against the stopper 121. The moment of the counter impact lever 120 is formed to be symmetrical so that the locking lever 110 is biased clockwise by the spring 115, that is, biased toward the locking pin 201. When an impact is applied in this state, the locking lever 110 is moved in a biased direction to bump against the locking pin 201 and then moves counterclockwise by a repulsing force. The counter impact lever 120 bumps against the stopper 121 and then moves clockwise due to a repulsing force. Then, the locking lever 110 and the counter impact lever 120 collide midway so that no more rotation is allowed to either of the members. Thus, as the counter impact lever 120 prevents the locking lever 110 from rotating counterclockwise, the locking state between the hook portion 111 and the locking pin 201 is prevented from unlocking due to an impact.

When the tray 100, having the above locking apparatus, is inserted into the drive main body 200, as shown in FIG. 3, the hook portion 111 of the locking lever 110 elastically biased by the spring 115 is elastically caught by the locking pin 201 so that a locking state is firmly maintained. Here, attraction acts between the permanent magnet 132 and the magnetic body 137 at the side where the plunger 131 is coupled to the coupling pin 114, and current does not flow. Thus, no additional power is consumed to control the position of the plunger 131 while the locking state is maintained.

Figure 4:
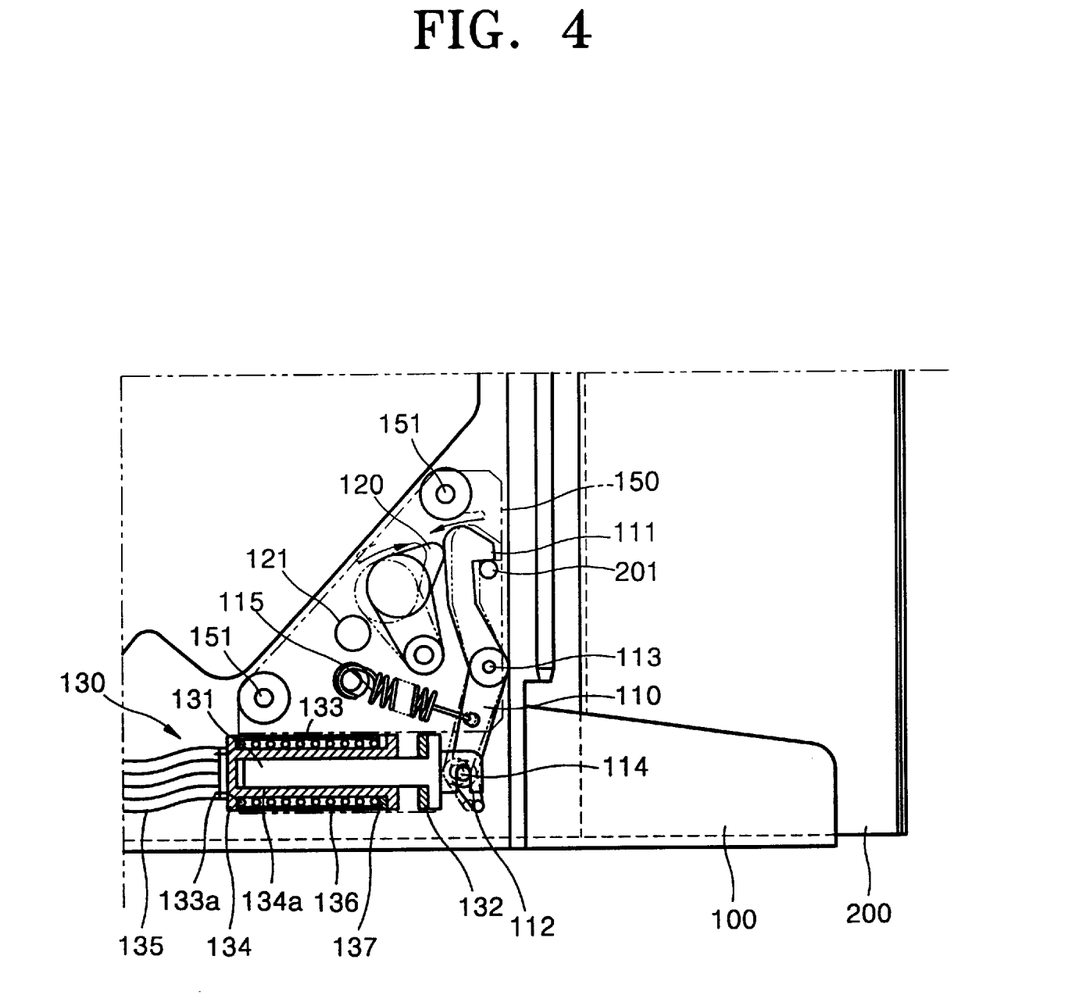

Next, a recording and reproducing operation is performed in the locking state. When an impact is applied from the outside, the counter impact lever 120 prevents the rotation of the locking lever 110 in the unlocking direction. That is, the locking lever 110 springs out counterclockwise after bumping against the locking pin 201. The counter impact lever 120 springs out clockwise after bumping against the stopper 121. The locking lever 110 and the counter impact lever 120 collide midway, as shown in FIG. 4, and do not rotate any further. Thus, even when an external impact is applied during recording and reproducing operations, since the counter impact lever 120 prevents movement of the locking lever 110 in the unlocking direction, the tray 100 is prevented from being ejected out of the main body 200.

Figure 5:
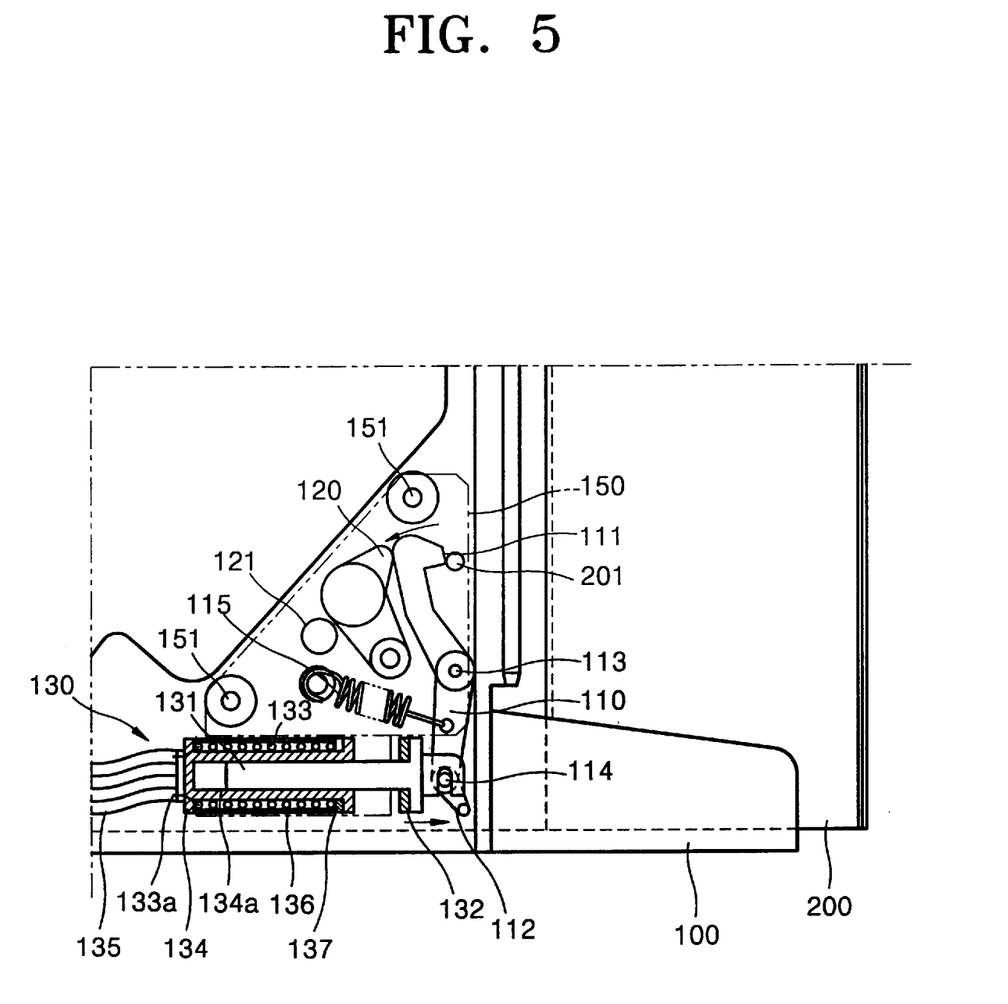
Figure 6:
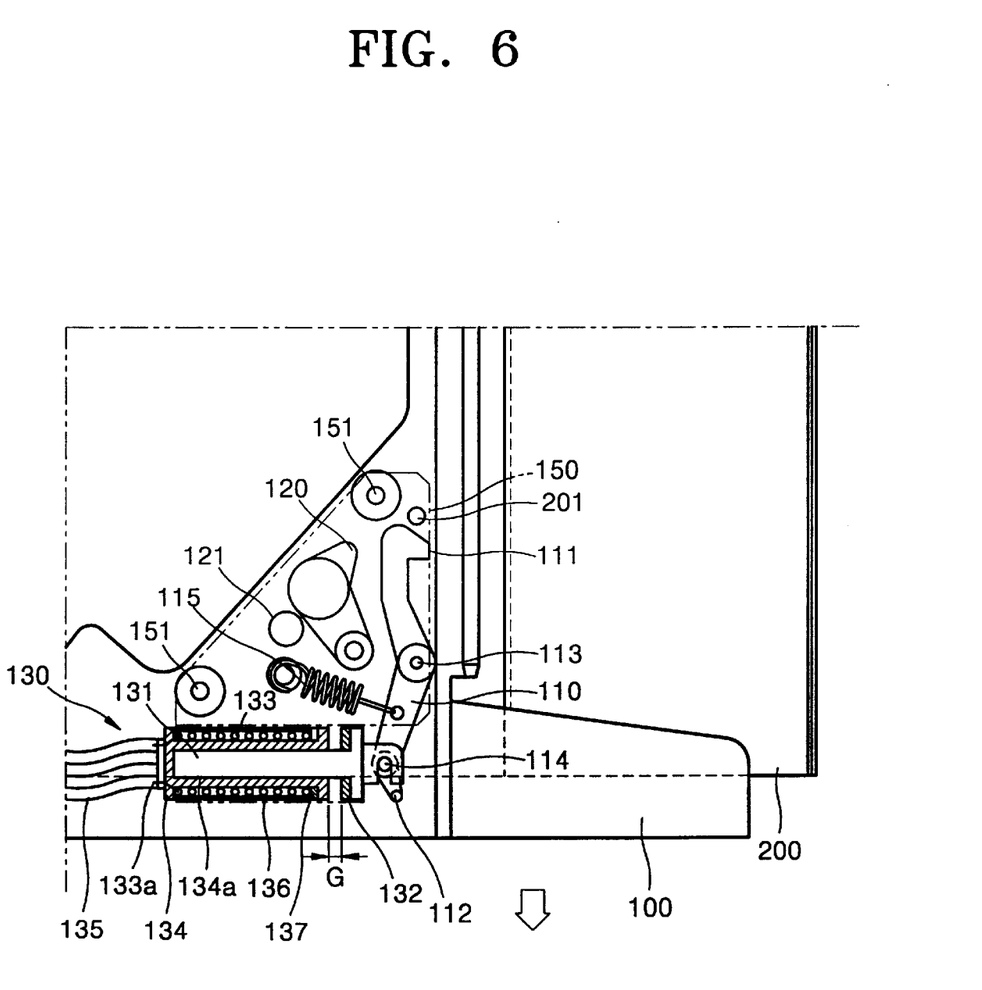
Figure 7:
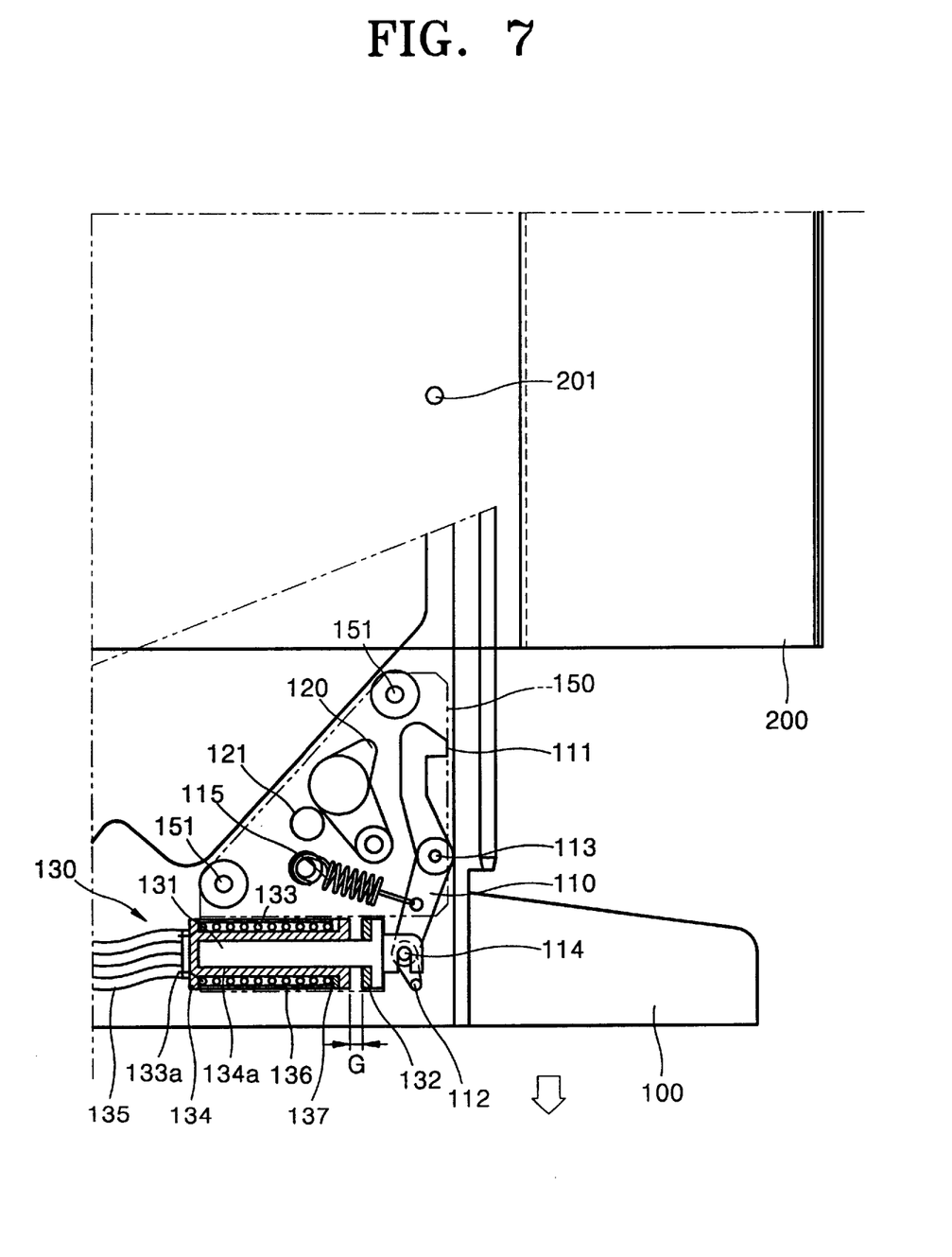

Next, when a user presses an eject button of a disc drive to draw the tray 100 from the main body 200, current is provided by the FPC 135 to the coil 133 so that a polarity in the opposite direction to the polarity of the permanent magnet 132 is formed at the end portion of the bobbin 134. Then, repulsion is generated between the end portion of the bobbin 134 and the permanent 132 so that the plunger 131 moves to rotate the locking lever 110, as shown in FIG. 5. Accordingly, the hook portion 111 is unlocked from the locking pin 201 and simultaneously the push unit (not shown) applying an elastic force to the tray 100 in a direction to the outside of the main body 200 from the inside thereof slightly pushes the tray 100 to the outside of the main body 200, as shown in FIG. 6. When the tray 100 springs out of the main body 200, the current applied to the coil 133 is cut off at once. Then, the plunger 131 and the locking lever 110 return to the original positions by the elastic force of the spring 115 and the attraction between the permanent magnet 132 and the magnetic body 137, as shown in FIG. 6. Thus, since the time to provide current to the coil 133 is instantaneous during the time when the unlocking operation is performed, and no current is applied for the other remaining time, a very small amount of power is consumed for the locking and unlocking operation. Then, the user pulls the tray 100 by hand to completely eject it from the main body 200, as shown in FIG. 7.

Figure 8:
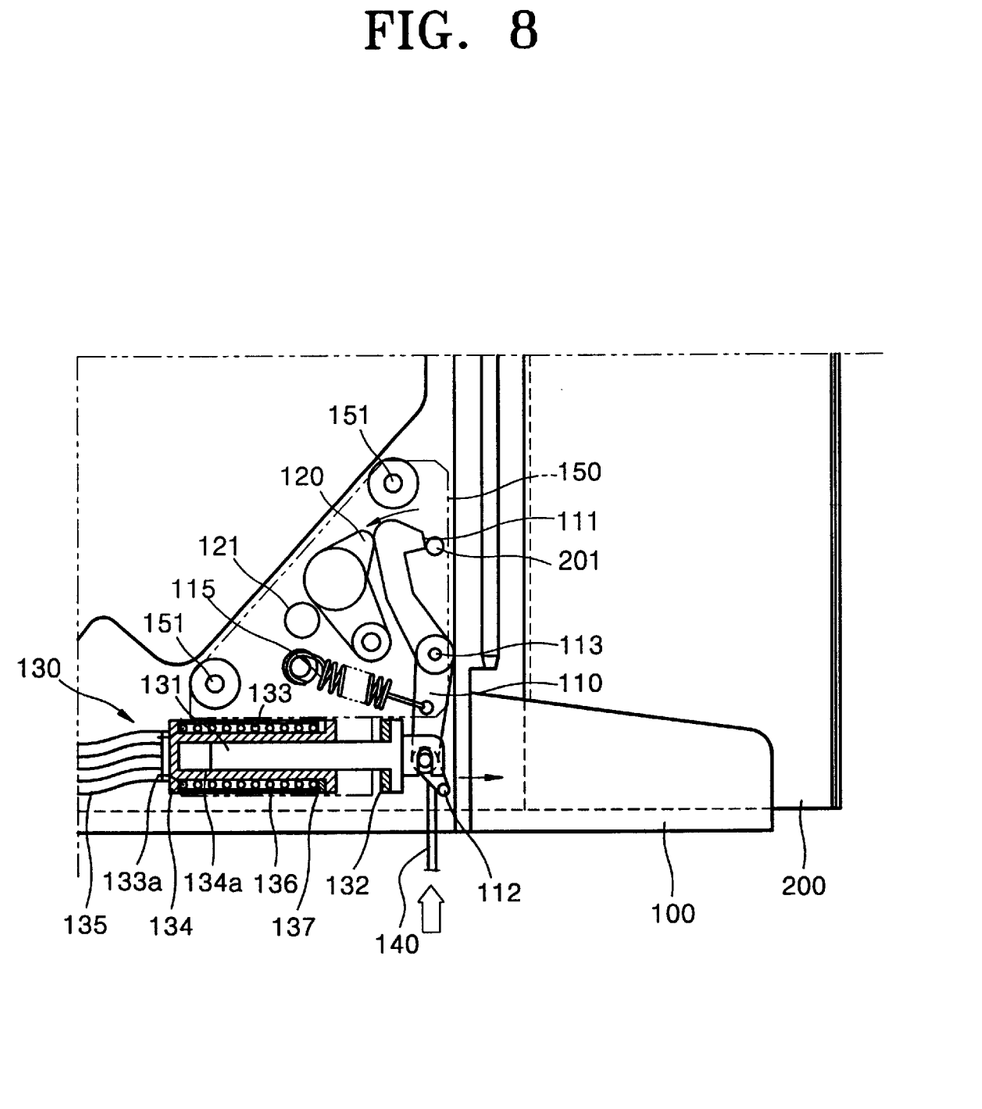
FIG. 8 is a view showing a state of manually unlocking the tray locking apparatus of FIG. 3.

In the state in which the tray 100 is locked in the main body 200, to manually eject the tray 100, as shown in FIG. 8, a user presses the manual push portion 112 of the locking lever 110 on the front surface of the tray 100 by using an object such as a pin 140. Then, the manual push portion 112 is pushed to the right side in the figure to rotate the locking lever 110 counterclockwise. Accordingly, the hook portion 111 is unlocked from the locking pin 201 so that the tray 100 is ejected from the main body 200.

Thus, the tray locking apparatus can smoothly perform a locking and unlocking operation with a very small amount of electric power compared to the conventional technology. In particular, when an external impact is applied, rotation of the locking lever 110 in an unlocking direction is prevented so that the tray 100 is prevented from being unlocked.

Figure 11:
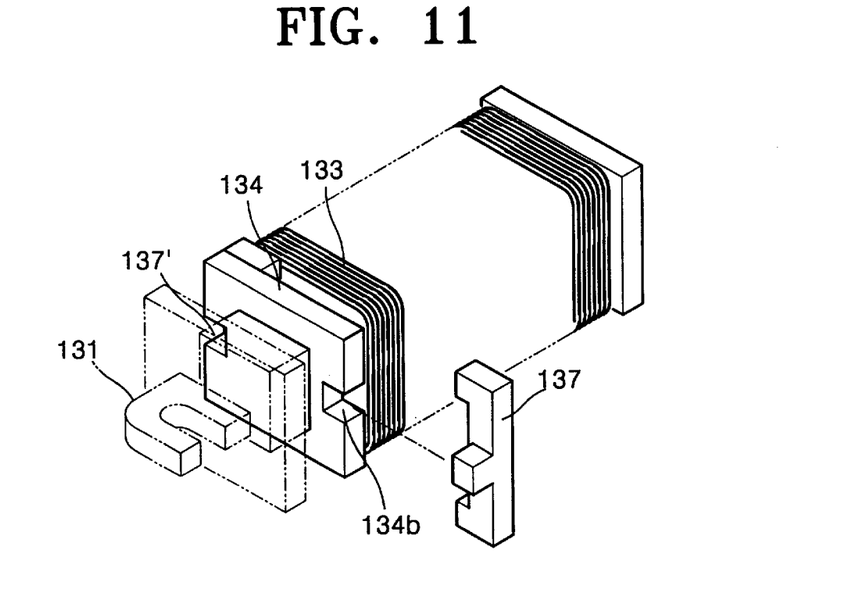
FIG. 11 is a perspective view showing an example of a modification of the magnetic body of FIG. 9.
Figure 12:
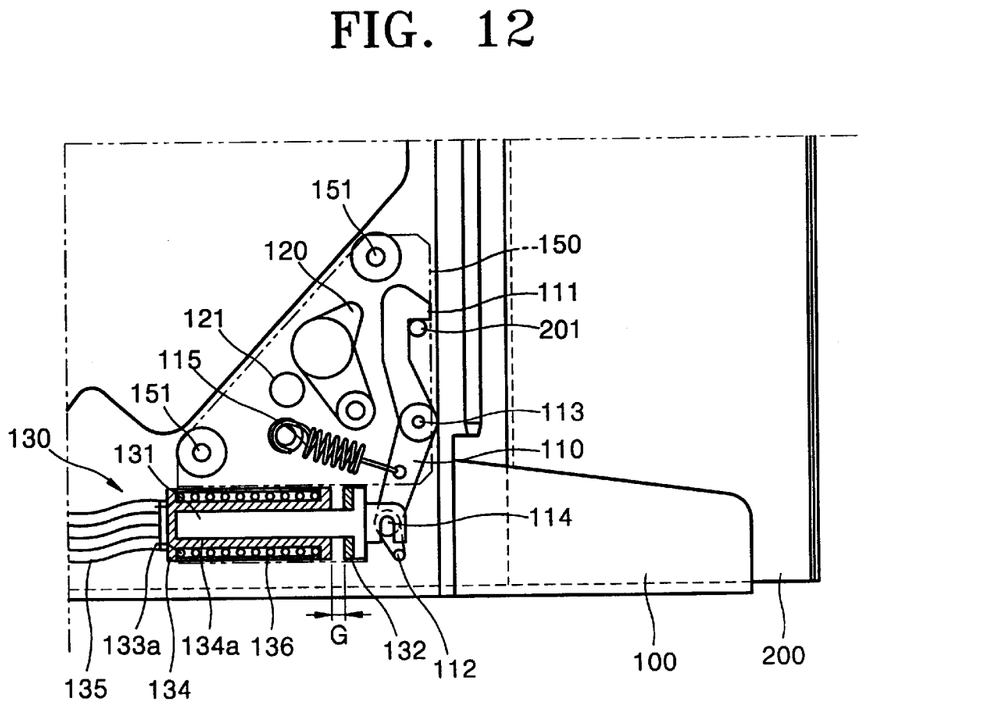
FIG. 12 is a view showing another example of a modification of the magnetic body of FIG. 9.

Although the additional magnetic bodies 137 and 137' are installed at the bobbin 134 to generate attraction with the permanent magnet 132 in the present embodiment, the bobbin 134 itself can be formed as a magnetic body, as shown in FIG. 11, without the additional magnetic bodies 137 and 137'. Then, attraction between the bobbin 132 and the permanent magnet 132 directly acts. Also, either the entire portion or part of bobbin 134 can be formed as a magnetic body considering the strength of the attraction with the permanent magnet 132.

Also, although, for the purpose of convenience in an assembly process, the structural members of the locking apparatus such as the locking lever 110, the counter impact lever 120, and the driving mechanism 130 are all installed at the bracket 150 as a unit, and the bracket 150 is fixed to the tray 100 by the coupling member 151 in the present embodiment, it is obvious that the bracket 150 can be omitted and the structural members can be installed directly at the tray 100.

As described above, in the tray locking apparatus of a disc drive according to the present invention, when an external impact is applied, a locking state can be firmly maintained. Also, the power consumed during the locking and unlocking operation can be reduced considerably.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A tray locking apparatus of a disc drive to lock a tray on which a disc is accommodated and which is inserted into a main body of the disc drive, the tray locking apparatus comprising:
   a locking pin provided at the main body;
   a locking lever rotatably installed at the tray and having a hook portion at one end thereof which is caught by the locking pin as the tray is inserted into the main body;
   an elastic member to elastically bias the locking lever in the direction in which the hook portion is caught by the locking pin;
   a driving mechanism to rotate the locking lever to escape from a position where the hook portion is caught by the locking pin when the tray is drawn; and
   a counter impact unit installed adjacent to the locking lever and having a moment to rotate in a direction opposite to that of the locking lever, so that when the locking lever is rotated by an impact in a direction to be unlocked, the counter impact unit rotates in the opposite direction and bumps against the locking lever.

2. The tray locking apparatus as claimed in claim 1, wherein the counter impact unit comprises:
   a counter impact lever rotatably installed at a position facing the locking pin with respect to the locking lever disposed therebetween; and a stopper, provided at a position facing the locking lever with respect to the counter impact lever disposed therebetween, to prevent rotation of the counter impact lever in one direction.

3. The tray locking apparatus as claimed in claim 1, wherein the driving mechanism comprises:

a bobbin having a cavity;

a plunger having one end inserted into the cavity of the bobbin and slideable and the other end coupled to the locking lever;

a coil wound around the bobbin;

a magnet installed at one side of the plunger where the plunger is coupled to the locking lever; and a magnetic body installed at the bobbin to generate attraction with the magnet.

4. The tray locking apparatus as claimed in claim 3, wherein the magnetic body is a ring member having a "C" shape inserted around the outer circumferential surface of the bobbin.

5. The tray locking apparatus as claimed in claim 3, wherein the magnetic body is a member having a "T" shape inserted into a coupling groove formed in the bobbin.

6. The tray locking apparatus as claimed in claim 3, wherein the magnetic body is integrally formed with the bobbin.

7. The tray locking apparatus as claimed in claim 1, further comprising a manual push portion extending from the locking member to be manually pushed and rotated by a user.

8. The tray locking apparatus as claimed in claim 3, wherein the locking lever further comprises a coupling pin at one end thereof to be coupled with the plunger.

9. The tray locking apparatus as claimed in claim 4, wherein a predetermined slight gap is provided between the magnet and an end portion of the bobbin to provide a predetermined magnetic force on the locking member.

10. A tray locking apparatus of a disc drive to lock a disc accommodating tray within a main body of the disc drive, the tray locking apparatus comprising:

a locking lever rotatably installed at the disc accommodating tray to engage with said main body as the disc accommodating tray is inserted into the main body;

an elastic member to elastically bias the locking lever in the direction to engage with the main body;

a driving mechanism to rotate the locking lever in a direction to disengage with the main body when the tray is drawn out of the main body; and a counter impact unit installed adjacent to the locking lever to rotate in a direction opposite to that of the locking lever when the locking lever is rotated by an impact in a direction to be disengaged with the main body such that the counter impact unit rotates in the opposite direction and stops rotation of the locking lever.

11. The tray locking apparatus as claimed in claim 10, wherein the driving mechanism further comprises a flexible printed circuit board to apply a signal to the driving mechanism to rotate the locking lever to disengage the main body.

* * * * *